United States Patent [19]
Rhodes et al.

[11] 3,732,710
[45] May 15, 1973

[54] LOCKABLE STEERING COLUMN ASSEMBLY

[75] Inventors: Alex Rhodes, Detroit; James Rose, St. Clair Shores, both of Mich.

[73] Assignee: Ford Motor Company, Dearborn, Mich.

[22] Filed: June 25, 1971

[21] Appl. No.: 156,782

[52] U.S. Cl. ................................. 70/239, 70/252
[51] Int. Cl. ..................... B60r 25/04, E05b 65/12
[58] Field of Search ...................... 70/182–185, 237–239, 248, 249, 252

[56] References Cited

UNITED STATES PATENTS

| | | | |
|---|---|---|---|
| 3,490,255 | 1/1970 | Wight et al. | 70/248 |
| 3,566,632 | 3/1971 | Wall et al. | 70/248 |
| 1,341,281 | 5/1920 | Randolph | 70/183 |
| 1,549,385 | 8/1925 | Ryan | 70/185 |
| 1,998,512 | 4/1935 | Manton | 70/185 |
| 2,204,908 | 6/1940 | Olson | 70/185 |

Primary Examiner—Marvin A. Champion
Assistant Examiner—Lawrence J. Staab
Attorney—John R. Faulkner, et al.

[57] ABSTRACT

A lockable steering column assembly for an automotive vehicle including a steering shaft, a shift tube positioned about the steering shaft and an outer tube secured to the body of the vehicle enclosing the shift tube. The lock means includes a slotted collar rotatable with the steering shaft and a sleeve rotatable with the shift selector tube. The sleeve is engagable with the slotted collar and with the fixed outer tube to lock the assembly and to prevent normal operation of the vehicle.

9 Claims, 4 Drawing Figures

PATENTED MAY 15 1973
3,732,710
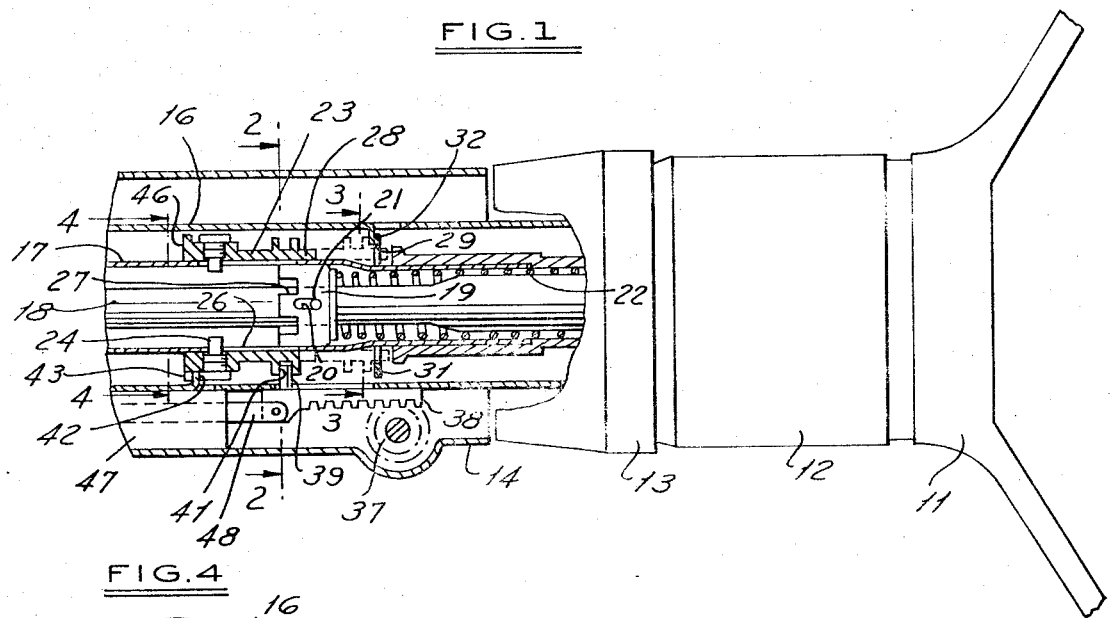
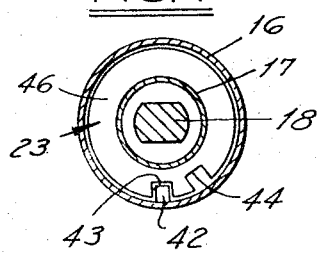
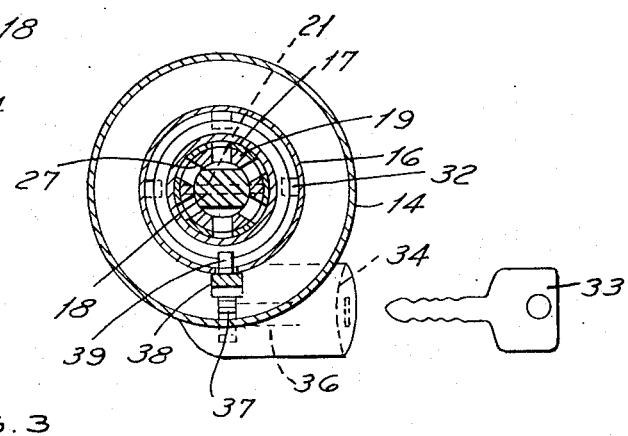
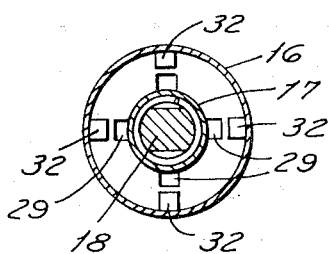
INVENTORS
ALEX RHODES
JAMES ROSE
BY
John R Faulkner
Leroy E Erickson
ATTORNEYS

LOCKABLE STEERING COLUMN ASSEMBLY

BACKGROUND AND SUMMARY OF THE INVENTION

To discourage theft and unauthorized operation of automotive vehicles, lockable steering column assemblies have been utilized which when in a locked position mechanically prevent movement and operation of the steering wheel and shaft and of the shift selector tube and lever. This invention provides a lockable steering column construction in which the locking mechanism is spaced axially downwardly from the steering wheel so as to not prevent tilting or swing-away movement of the steering wheel relative to the remainder of the steering column. The locking elements engage the outer tube in a full strength portion, spaced appreciably from the shift selector lever cut-away.

This invention further provides a lockable steering column construction which is efficiently designed, exceptionally sturdy and reliable in operation.

BRIEF DESCRIPTION OF THE DRAWINGS

FIG. 1 is a cross sectional view of a portion of a steering column assembly embodying the invention;

FIG. 2 is a diametrical cross sectional view along line 2—2 of FIG. 1;

FIG. 3 is a diametrical cross sectional view along line 3—3 of FIG. 1; and

FIG. 4 is a diametrical cross sectional view taken along line 4—4 of FIG. 1.

DETAILED DESCRIPTION OF A PREFERRED EMBODIMENT

FIG. 1 of the drawings shows an intermediate portion of the steering column assembly. Externally visible components of the assembly are a portion of a steering wheel 11 and a number of trim shroud elements 12, 13 and 14 that cover the mechanical portions of the steering column assembly. A shift selector lever (not shown) joins the remainder of the steering column assembly in the area of shroud element 13. Similarly, the turn signal indicator lever and the emergency flasher control button are located in the shroud element 12.

The three general components of the steering column assembly are the outer tube 16 which is attached to the body portion of the automobile, the shift selector tube 17 which is connected to and is axially rotatable with the shift selector lever (not shown) and thirdly, the steering shaft 18 to which the steering wheel 11 is attached at one end.

The primary purpose of the subject invention is to provide means to lock the steering shaft 18 and the shift selector tube 17 to the fixed outer tube 16 when the vehicle is not in operation and the ignition key is removed. A further purpose of the invention is to provide a lock-out mechanism which will prevent ignition unless the shift selector lever is in one or more predetermined positions.

A collar 19 is positioned about the steering shaft 18 and is connected by a pin 21 that extends through a slot 20 formed in the steering shaft which permits axial sliding movement of the collar relative to the steering shaft. A compression spring 22 engages one axial side of the collar and urges it toward a normal position, as shown in FIG. 1. The steering shaft and collar are received within the shift selector tube 17 and are freely rotatably relative to it.

A sleeve 23 is positioned about the shift selector tube 17 and is axially slidable relative thereto. Studs 24 are mounted on the sleeve and extend radially inwardly through axially extending slots 26 formed in the shift selector tube. The studs 24 perform two functions. First, they prevent rotation of the sleeve 23 relative to the shift selector tube 17 while simultaneously permitting relative axial displacement and, secondly, they are receivable within the notches 27 formed by the fingers of the collar 19 so as to lock the shift tube 17 to the steering shaft 18. On the end of the sleeve 23 nearest the steering wheel 11 are located a number of axially extending fingers 28. When the sleeve is in an extreme upward position, closest to the steering wheel, the fingers 28 extend through openings or notches 29 formed in an apertured disc or plate 31 fixed to the outer tube 16. The outer tube has four tabs 32 which are bent radially inwardly to provide a mounting means for the apertured disc 31 which may be secured by welding, for example. It may be seen that when the fingers 28, the openings 29, the studs 24 and the notches 27 are in alignment so as to be mutually receivable, the steering shaft 18 and the shift selector tube 17 are solidly connected to the outer tube 16 which is fixed to the body portion of the automobile. Under this condition, the rotation or operation of the steering shaft and the shift selector tube is precluded.

The sleeve 23 is displaced axially when the vehicle ignition key 33 is placed within the lock cylinder 34 and rotated. The lock cylinder contains a rotatable portion 36 having a gear 37 secured to it which is engagable with a rack 38 axially slidably attached to the outer tube. The rack includes a radially inwardly extending finger 39 which extends through the outer tube 16 and is received within an annular groove 41 formed between two flanges on the sleeve 23. Rotation of the gear 37 causes the rack to move in an axial direction which, in turn, causes the sleeve to be axially displaced. The sleeve is free to turn about its axis relative to the finger 39 because the finger slides within groove 41.

FIG. 4 shows notches 43 and 44 which extend axially from the lower end face 46 of the sleeve 23. One of the notches receives tab 42 which protrudes radially inwardly from outer tube 16 when the shift selector lever is in "Park" or "Neutral" position. This axial extreme position, shown by FIG. 1, causes switch 47 to close the starter motor circuit of the engine. When the shift selector lever is in any other position than "Park" or "Neutral," face 46 of sleeve 23 abuts tab 42 and prevents the sleeve from entering the extreme axial "Start" position.

An electrical switch 47 may be operated by the movements of the rack 38, for example, to break the ignition circuit when the key is out of the keyway and the sleeve is in its extreme rightwardly or upward location or to close the starter motor circuit. The switch actuating mechanism is shown as an arm 48 which transmits the movements of rack 38 to the switch.

OPERATIONS

In FIG. 1, the sleeve 23 is shown in its lowermost position such as would be when the ignition key 33 had rotated the gear 37 to its "Start" position. The broken lines of FIG. 1 illustrate the position of the sleeve when it is in its uppermost or "Park" position. Intermediate positions may be provided for the "On," the "Off" and the "Accessory" positions of the lock cylinder and sleeve. Rotation of key 33 and the lock cylinder gear 37 in a clockwise direction according to FIG. 1 will move the rack 38 in a rightward direction. When the selector tube 17 is rotatively positioned in "Park," the openings 29 formed in the disc 31 are in axial alignment with the fingers 28 extending from the upper end of the sleeve 23 to permit the fingers to extend through the openings, as shown by the dotted lines. The studs 24 will engage the fingers of the collar 19 and lock with them if they are aligned with notches 27. If they are not in alignment, the studs will depress the collar against the spring 22 in an upward direction. At the first turn of the wheel 11, the collar 19 will resiliently snap back so that the notches 27 engage the studs 24 and the steering shaft 18 is locked to the sleeve 23 which, in turn, is locked to the outer tube 16.

We claim:

1. A lockable steering column assembly for an automotive vehicle comprising:

an outer tube attached to the body portion of the automotive vehicle, a shift selector tube received within the outer tube being rotatable relative thereto, a steering shaft received within the shift selector tube being rotatable relative to the outer tube and the shift selector tube, first interengagable means attached to said shift selector tube and said steering shaft, respectively, being axially engagable and disengagable to lock and release the selector tube and the steering shaft, second interengagable means attached to said shift selector tube and said outer tube, respectively, being axially engagable and disengagable to lock and release the selector tube and the outer tube.

2. A lockable steering column assembly according to claim 1 and including:

said second interengagable means including male and female and abutment elements, said male elements being receivable within said female element upon predetermined relative axially rotated positions of the shift selector tube and the outer tube, said male element being engagable with said abutment element to prevent receipt of the male element within the female element upon other relative axially rotated positions of the shift selector tube and the outer tube.

3. A lockable steering column assembly for an automotive vehicle comprising:

an outer tube attached to the body portion of the automotive vehicle, a shift selector tube received within the outer tube being rotatable relative thereto, a steering shaft received within the shift selector tube being rotatable relative to the outer tube and the shift selector tube, a sleeve attached to said shift selector tube to rotate therewith, interengagable means formed on said sleeve, steering shaft and outer tube, said sleeve being movable in one axial direction relative to said shift selector tube to engage said interengagable means and prevent rotation of said shift selector tube and said steering shaft relative to said outer tube, said sleeve being movable in the other axial direction relative to said shift selector tube to disengage said interengagable means and permit rotation of said shift selector tube and said steering shaft relative to said outer tube.

4. A lockable steering column assembly for an automotive vehicle comprising:

an outer tube attached to the body portion of the automotive vehicle, a shift selector tube received within the outer tube being rotatable relative thereto, a steering shaft received within the shift selector tube being rotatable relative to the outer tube and the shift selector tube, a collar attached to said steering shaft to rotate therewith, a sleeve attached to said shift selector tube to rotate therewith, interengagable means formed on said collar and sleeve and on said sleeve and outer tube, said sleeve being movable in one axial direction relative to said shift selector tube to engage said interengagable means and prevent rotation of said shift selector tube and said steering shaft relative to said outer tube, said sleeve being movable in the other axial direction relative to said shift selector tube to disengage said interengagable means and permit rotation of said shift selector tube and said steering shaft relative to said outer tube.

5. A lockable steering column assembly for an automotive vehicle comprising:

an outer tube attached to the body portion of the automotive vehicle, a shift selector tube received within the outer tube being rotatable relative thereto, a steering shaft received within the shift selector tube being rotatable relative to the outer tube and the shift selector tube, a collar positioned about said steering shaft and connected thereto to rotate therewith, said collar having a plurality of axially opening grooves, an axially slidable sleeve positioned about said shift selector tube and connected thereto to rotate therewith, one or more axially extending slots formed in said shift selector tube, radially inwardly directed means connected to said sleeve extending through said slots and engagable with said grooves of said collar, a member secured to said outer tube extending radially inwardly therefrom including one or more openings, said sleeve having one or more axially extending fingers receivable within said openings, said sleeve being movable in one axial direction on said shift selector tube to engage said radially inwardly directed means with said grooves and said fingers with said openings to lock said steering shaft and said shift selector tube from rotation relative to said outer tube, said fingers being receivable within said openings only for those predetermined positions of rotation of the shift selector tube in which the fingers and openings are aligned, said sleeve being movable in the other axial direction to release engagement of said first means and said groove and of said fingers with said openings.

6. A steering column assembly according to claim 5 and lock means including a rotatable portion, a key insertable into said lock means and rotatable to cause movement of said rotatable portion, second means interconnecting said rotatable portion and said sleeve so that rotation of said rotatable portion causes axial movement of said sleeve along said shift tube selector.

7. A steering column according to claim 6, and said rotatable portion including a pinion gear, said second means including a rack engagable with said pinion gear, said sleeve member including an annular groove having a radially outwardly directed opening, a finger extending radially inwardly from said second means into said groove, said shift selector tube being axially rotatable relative to said finger, said shift selector tube and said finger movable together in axial directions.

8. A steering column assembly according to claim 5 and spring means biasing said collar to a normal position, said collar being axially displaceable to accommodate misalignment of said first means and said grooves.

9. A steering column assembly according to claim 5 and said sleeve and said outer tube including abutment means preventing certain axial movements of said sleeve unless the shift selector tube and the outer tube are in predetermined axially rotated relative positions.

* * * * *